United States Patent [19]

Dick, Jr.

[11] 4,347,137

[45] Aug. 31, 1982

[54] APPARATUS FOR CONSOLIDATION OF SLURRIES OF SOLID PARTICULATE MATERIALS

[75] Inventor: Perry J. Dick, Jr., Pittsburgh, Pa.

[73] Assignee: Norwood Minerals, Inc., Pittsburgh, Pa.

[21] Appl. No.: 274,541

[22] Filed: Jun. 17, 1981

[51] Int. Cl.[3] .............................................. B01D 33/00

[52] U.S. Cl. .................................... 210/329; 210/350; 210/499

[58] Field of Search ............... 210/224, 324, 325, 329, 210/346, 350, 351, 499

[56] References Cited

U.S. PATENT DOCUMENTS

| | | | |
|---|---|---|---|
| 1,977,480 | 10/1934 | Hiller et al. | 210/224 X |
| 2,937,080 | 5/1960 | Komarek et al. | 44/10 G |
| 3,278,031 | 10/1966 | Rosaen | 210/350 X |
| 3,288,293 | 11/1966 | Essel | 210/107 |
| 3,502,116 | 3/1970 | Crawford | 210/499 X |
| 3,617,551 | 11/1971 | Johnston | 210/350 X |
| 3,699,881 | 10/1972 | Levin et al. | 210/499 X |
| 3,900,403 | 8/1975 | Randle et al. | 210/350 |
| 4,022,694 | 5/1977 | Fruman | 210/350 |
| 4,208,188 | 6/1980 | Dick, Jr. | 44/10 R |

FOREIGN PATENT DOCUMENTS

| | | | |
|---|---|---|---|
| 484882 | 1/1976 | U.S.S.R. | 210/350 |

*Primary Examiner*—John Adee
*Attorney, Agent, or Firm*—Robbins & Laramie

[57] ABSTRACT

An apparatus for removing liquid from a slurry of solid particulate material and for consolidating said solid material into a shape-retaining slug is disclosed which comprises (a) a cylindrical consolidation chamber in which the slurry is to be consolidated, which is substantially sealed against the passage of solid material, said chamber comprising (i) a first cylindrical piston mounted in a stationary position with its axis aligned vertically, the upper surface of said piston being its working face, (ii) a mold comprising a cylindrical wall defining a cylindrical bore in which said first piston is movable axially and which is disposed with its axis aligned vertically and a horizontal table having a circular opening through one end thereof, said table being mounted to the upper edge of said wall so that said opening communicates with said bore in said wall and the surface of the table extends outward from said wall in a direction perpendicular to the axis thereof, said mold having a compression position in which the face of said first piston is within the lower edge of said bore and a charging position in which the face of said first piston is at about the same level as the upper surface of said table, and (iii) a second cylindrical piston having its axis aligned vertically and movable axially within said cylindrical bore, the lower surface of said piston being its working face, (b) a drainage means for allowing liquid to escape from said chamber during consolidation of said slurry, (c) a porous structure for retaining solid particulate material within said chamber and for allowing liquid to escape from said chamber during consolidation, said porous structure being disposed between said drainage means and said slurry within said chamber.

12 Claims, 11 Drawing Figures

APPARATUS FOR CONSOLIDATION OF SLURRIES OF SOLID PARTICULATE MATERIALS

BACKGROUND OF THE INVENTION

1. Field of the Invention

This invention relates to an apparatus and a process for consolidating slurries of solid particulate materials into slugs.

2. Description of the Prior Art

In a coal mining operation, coal is removed from the mine and passed to a crushing plant where is is comminuted or crushed to facilitate removal of sulfur, ash and other impurities. During the crushing operation, the coal is washed with water to entrain particles of coal, sulfur and ash thereby greatly reducing the danger of fire, explosion and airborne coal dust hazards. Coal cleaning, which is required primarily to reduce the sulfur and ash content, has become an increasingly important factor in coal preparation in order to meet the tighter environmental standards. The following methods are currently employed to extract and upgrade the quality of the coal which methods result in the very fine-grained coal being lost to the washing and finally being disposed of as slurry refuse. These methods can also be employed to upgrade the quality of the slurry refuse.

The particles in the slurry can be classified by means of a hydrocyclone, a sizing device consisting of a conical-cylindrical apparatus which operates under a pressure of more than 5 psi. By means of rotational fluid-solid motion, particles in the slurry are separated according to their mass.

Another method of upgrading coal slurry is by concentration. Froth flotation is a complex physicochemical process which takes place in a slurry in which the surface of one or more minerals are made water-repellant and responsive to attachment of air bubbles. Beneficiation is accomplished when air bubbles are pumped into the slurry and coal-laden bubbles rise to the surface, leaving behind minerals which have not responded to the treatment. Flotation chemicals and reagents, called collectors and modifiers, attach themselves to the mineral surface through physical and chemical sorption.

Another method is mechanical dewatering in which water is removed by means of gravity or centrifugal forces through screens or sedimentation. Sedimentation is used either for clarification or thickening. Thickening increases the concentration of solids in the slurry, whereas clarification is designed to produce a solid-free slurry. Using a centrifuge without screens, solids are segregated at the bottom toward the outside of the centrifuge and water is collected and decanted off from the center. The most common screening method used is vacuum filtration through through a 40×60 mesh stainless steel screen. Air is sucked through the slurry and the screen resulting in a cake of solids and a filtrate which is drawn off.

A further method of dewatering coal slurry is by thermal drying. This can be accomplished by directly contacting the slurry with warm air, directly contacting the slurry with the heated shell of the dryer or heated particles, or by radiation from a hot surface to the slurry.

All the above-mentioned methods of slurry dewatering or extraction of fine coal are expensive and are being incorporated to various degrees in only the most recently built preparation plants. Those plants which have been in operation for some time do not have these facilities and it is either impractical or too expensive to install these new coal upgrading techniques. As a result, the fine particles of coal, clay, sulfur, iron and other impurities, which form a major part of the slurry refuse coming out of a substantial number of coal preparation plants currently under production, are still being pumped to settling or slurry ponds where the heavier particles settle out and some of the water may be returned to the plant for additional washing operations or otherwise disposed of.

The compositions of the many slurry ponds throughout the country vary widely depending on the composition of the coal being mined and the type of coal extraction and preparation operations. In fact, the composition in each individual slurry pond varies depending on particle sizes, location with respect to the inlet pipe and even in relation to such variables as the prevailing wind. Over the years many hundreds of acres of coal slurry has been collected in hundreds of ponds throughout the world. These slurry ponds are not only ugly blemishes on the countryside, but are hazardous to man and animal and detrimental to the environment. The vast quantities of water used to wash the coal become polluted by the coal particles and other associated mineral impurities washed from the coal resulting in large amounts of coal in the form of particles which cannot be reclaimed for use as a valuable fuel but are disposed of as waste.

Thus, a significant problem associated with coal processing is the dewatering and drying of the refuse products in slurry form. Fine coal handled or cleaned in slurry form in coal preparation plants must be dewatered to rend it suitable for conveying and blending, to decrease transportation costs, and to increase its heating value. Fine refuse dewatering is very difficult and expensive and is therefore not commonly used because it would represent a significant portion of the overall cost of coal washing.

Prior to the present invention, the coal particles in coal slurry could not be utilized for their fuel value without first removing most of the water since about 100 Btu/lb are lost for every 1 percent of water content in the coal and because the coal slurry is difficult to handle and convey. The centrifuging and heating methods presently used to remove the water are slow, expensive and inefficient. Once the water content has finally been reduced, the coal must then be compacted by a briquetting technique into a form which is easy to handle. However, in spite of these methods, all of the polluted slurry ponds remain and more are constantly being built to meet the demands of the washing plants.

In U.S. Pat. Nos. 2,800,072, 3,276,594, 3,540,586, 3,762,560 and 3,900,403 filter presses are disclosed which produce filter cakes and filtered liquids from slurries. U.S. Pat. No. 4,019,431 discloses a process for dewatering sludge by compression of sludge cakes between movable filter bands to force out the water. U.S. Pat. Nos. 436,044, 478,539, 504,098, 1,231,929, 1,344,261, 1,631,037, 1,647,075, 2,076,315, 2,275,398, 2,623,432, 2,675,304, 2,937,080 and German Pat. No. 823,442 disclose various apparatus having cylinders and pistons for separating liquids from solids or liquid-solid mixtures and U.S. Pat. Nos. 2,331,126, 2,358,765, 2,697,979, 2,904,835, 3,055,290, 3,548,456 and 3,736,083 disclose various apparatus with cylinders and pistons for forming briquettes of particulate material. U.S. Pat. Nos. 4,049,390 and 4,049,392 disclose apparatus for extruding briquettes of a mixture of powdered coal and a binder. U.S. Pat. No. 3,288,293 discloses an apparatus for removing water from coal mud or peat. However, none of the prior art methods or apparatus indicated above disclose the production of substantially clean water and a useful fuel product from coal slurries by mechanical means.

In the production of metallic copper from copper sulfide ores, the principal method of concentration is froth flotation. The general scheme of concentration involves crushing, grinding, classification, flotation and dewatering to produce a concentrate which will analyze 15-30% copper. The flotation concentrate is dewatered, filtered, and shipped to the smelter. Large quantities of water must be removed from the concentrate during the smelting operation at significant expense.

In the recovery of copper values by the leaching of waste dumps or ore bodies, pregnant liquor is passed over scrap iron as a precipitant to produce "cement" or "precipitate" copper. This method of precipitating copper, while simple to operate, requires much hand labor and produces an impure cement copper which is usually blended with concentrates as a feed to a smelter. After filtration, the precipitate contains about 35% water.

Both copper concentrates and precipitates contain large quantities of water which must be removed during the recovery process. Although numerous methods have been devised for dewatering these concentrates and precipitates, none provides an economical means for significantly reducing the water content.

In my prior U.S. Pat. No. 4,208,188, I describe an apparatus and process which is capable of removing water from coal slurry and producing a useful fuel product by subjecting the slurry to one-dimensional consolidation by the application of compressive stress. This patent is incorporated herein by reference as though set forth in full. The patented apparatus comprised a cylindrical chamber with a reciprocating piston in which the slurry was to be consolidated. Upon application of the compressive stress, water was removed from the slurry and drained through a porous member having a porous structure similar to the quasi-triangular porous structure of a woven screen having a mesh size in the range of about 50 to 100 microns. The apparatus effectively removes the water from an aqueous slurry and produces a slug of consolidated material.

It has been found, however, that after repeated use, the quasi-triangular porous member becomes clogged with solid material from the slurry and deformed from the large compressive stress applied to the slurry within the consolidation chamber. As a result, the porous structure of the porous member no longer has the configuration desired for effective water removal, but rather, exhibits a flattened structure in which solid particles from the slurry are embedded. Because of the change in structure, the porous member cannot be readily unclogged, for example, by rinsing with water. Moreover, since the porous member is located on the inner face of the piston which reciprocates within the cylindrical consolidation chamber, it cannot be replaced easily with a new porous member when the old one becomes ineffective. The apparatus must be dismantled in order to replace the worn porous member. Therefore, replacement is very unsatisfactory because it requires that the entire continuous operation of the process be shut down for a period of time.

SUMMARY OF THE INVENTION

The drawbacks of the prior art methods and apparatus for removing water from aqueous slurries of solid particulate materials and for consolidating the solid material into slugs have been obviated by the present invention. In accordance with the present invention, a slurry of solid particulate material is subjected to high compressive stress in an enclosed apparatus with provisions for drainage of the liquid from the slurry and consolidated in a short period of time to yield a slug of the solid material having a low moisture content. The slurry is compressed by subjecting it to one-dimensional consolidation by applying stresses through two pistons in a cylindrical apparatus with means provided for drainage of the liquid from the slurry upon application of the compressive stress. The invention has been found to be particularly suitable for removing water from aqueous slurries of solid particulate material.

The apparatus of the present invention comprises a cylindrical consolidation chamber in which the slurry is to be consolidated, which is substantially sealed against the passage of solid material therefrom. The consolidation chamber comprises a first cylindrical piston mounted securely in a stationary position with its axis vertically aligned. The upper flat circular surface of this first piston is its working face.

The consolidation chamber further comprises a mold which comprises a cylindrical wall defining a cylindrical bore in which the first piston is movable axially and which is disposed with its axis aligned vertically. The mold further comprises a horizontal table having a circular opening through one end thereof. The table is mounted securely to the upper edge of the cylindrical wall so that the opening through the table communicates with the bore of the wall and the surface of the table extends outward from the wall in a direction perpendicular to the axis of the wall. The mold occupies two positions during operation of the apparatus. In the compression position of the mold, the face of the first piston is disposed within the lower edge of the cylindrical bore so that the lower end of the mold is closed thereby preventing the passage of solid particles from the chamber. When the mold is in its charging position, the first piston is disposed within the mold so that its face is at about the same level as the upper surface of the table.

The consolidation chamber also comprises a second cylindrical piston with its axis aligned vertically which is movable within the cylindrical bore of the mold. The lower flat circular surface of this second piston is its working face. When the face of the second piston is within the upper edge of the cylindrical bore in the mold, the upper end of the mold is closed to the passage of solid particles from the chamber.

A drainage means is provided to allow liquid to escape from the chamber during consolidation of the slurry. Holes extending through the face of the pistons or the wall of the mold would function as suitable drainage means.

A porous structure is disposed between the drainage means and the slurry within the consolidation chamber which retains solid particulate material within the chamber while permitting the liquid being removed from the slurry to escape from the chamber through the drainage means with which it communicates.

A preferred porous structure comprises a sheet of elastic material and a pair of woven wire screens disposed adjacent to each other. The sheet of elastic material is placed over the inside surface of the consolidation chamber having the drainage means therein. The sheet of elastic material is provided with a plurality of holes therethrough which communicate with the drainage means.

A pair of woven wire screens having the same plain weave and mesh size are disposed adjacent to the sheet of elastic material. The two screens are preferably disposed in juxtaposition with each other so that the points where the wires of one screen cross are over the openings in the other screen. When compressive stress is applied to the charge of slurry in the consolidation chamber, the two screens are forced together against the sheet of elastic material so that the portions of the woven wires of one screen which face the other screen at the points where the wires of the first screen cross engage the openings of the other screen. This intimate engagement of the meshes of the two screens under compression forms a porous structure in which the effective mesh size is substantially smaller than the mesh size of either screen alone.

When the compressive stress is removed following consolidation of the slurry, the sheet of elastic material returns to its normal thickness causing the two screens to become disengaged. When disengaged, the two screens are separated a sufficient distance so that the effective mesh size returns to the mesh size of each screen alone. Any solid particles from the slurry which become lodged in the porous structure of the two engaged screens during consolidation of the slurry immediately become dislodged from the screens as soon as they disengage following removal of the compressive stress therefrom. Thus, it is very difficult for the screens to become permanently clogged with solid particulate material which tends to lodge itself in the mesh of the screen upon repeated application of compressive stress. Moreover, because two screens with larger openings and made of heavier gauge wire can be used to obtain a much smaller effective mesh size and because the screens are supported by a layer of elastic material, they greatly resist permanent deformation under the extreme loads to which they are subjected.

In a preferred embodiment, the porous structure further comprises a third screen having a mesh size larger than that of the pair of screens. The third screen is disposed between the sheet of elastic material and the pair of identical screens to further protect the two screens used primarily as the means for removing water from the slurry against deformation and clogging. The mesh size of the third screen is preferably a multiple of the mesh size used for the pair of screens so that, upon application of compressive stress to the slurry in the chamber, the portions of the woven wires of the larger screen which face the points where the wires of the larger screen cross intimately engage every second or third opening, for example, of the smaller screen. Additional larger screens can be used in the porous structure if further support of the pair of smaller screens is required.

The apparatus of the present invention further comprises a first pressure means, such as a hydraulic cylinder, for moving the mold back and forth between its compression position and its charging position and for maintaining the mold in each of these positions during operation of the apparatus.

A compression means, such as a hydraulic cylinder, is provided for reciprocating the second piston axially within the bore of the mold and for applying compressive stress to the slurry within the chamber to cause consolidation thereof.

The apparatus additionally comprises a charging box comprising at least one vertically aligned wall and two horizontally aligned open ends which define a volume. The box is slidable horizontally on the table of the mold between a filling position and a charging position. In the filling position, the charging box is disposed on the table so that the lower end of the box is closed to the flow of slurry therethrough. When the charging box is in its charging position, the box is disposed on the table so that the lower end thereof communicates with the bore of the mold.

A second pressure means, such as a hydraulic cylinder is provided for sliding the charging box back and forth between its filling position and its charging position and for maintaining it in each of these positions during operation of the apparatus.

The apparatus is further provided with a means for filling the charging box with a predetermined amount of slurry. The filling means is disposed over the charging box when it is in its filling position on the table. A hopper filled with slurry having an open lower end with a knife blade for opening and sealing this end is an example of a suitable filling means.

The present apparatus operates according to the following sequence of steps. When the mold is filled with slurry and is disposed in its compression position and the charging box is in its filling position, the compression means is actuated thereby moving the second piston downward into the bore of the mold and applying compressive stress to the slurry through the second piston to cause the slurry to consolidate into a slug of solid material. If the first pressure means such as a hydraulic cylinder does not hold the mold rigidly in the compression position, but rather applies enough pressure to support the weight of the filled mold and offers some resistance to its downward vertical movement, when a large amount of compressive stress is applied by the compression means through the second piston some of the pressure will be applied through the slurry to the wall of the mold causing the mold to move down over the first piston until equal amounts of pressure are applied to the slurry to both pistons. Since the mold in essence "floats" between the two pistons when this occurs, this arrangement is referred to as a floating platen mold. At about the same time that the compression means is actuated, the filling means is actuated thereby filling the charging box with a predetermined amount of slurry.

Following consolidation of the slurry in the mold and filling of the charging box with slurry, the compression means is actuated thereby moving the second piston upward out of the bore of the mold and the first pressure means is actuated thereby moving the mold from its compression position down to its charging position. As the mold is being moved downward it is stripped from the consolidated slug which is disposed on top of the first piston.

After the mold has been completely stripped from the slug, the second pressure means is actuated thereby sliding the filled charging box on the table from its filling position to its charging position. As the charging box moves over the top of the first piston, it pushes the slug off of the upper surface of the first piston and the table.

As soon as the charging box is disposed in its charging position, the first pressure means is actuated thereby moving the mold up from its charging position to its compression position. As the mold and charging box are moved upward, the slurry in the charging box flows into the bore of the mold.

After the mold has been filled with slurry and has reached its compression position, the second pressure means is actuated thereby sliding the charging box on the table from its charging position to its filling position. The entire operation can then be repeated.

Using the apparatus and process of the present invention, it is possible to remove the water from a slurry of solid particulate material and to form a shape-retaining slug of the material having a water content of less than about 12 percent. The present invention can advantageously be employed to consolidate mineral slurries, such as slurries of coal, copper, molybdenum, iron ore, and the like.

DESCRIPTION OF THE PREFERRED EMBODIMENTS

Figure 1:
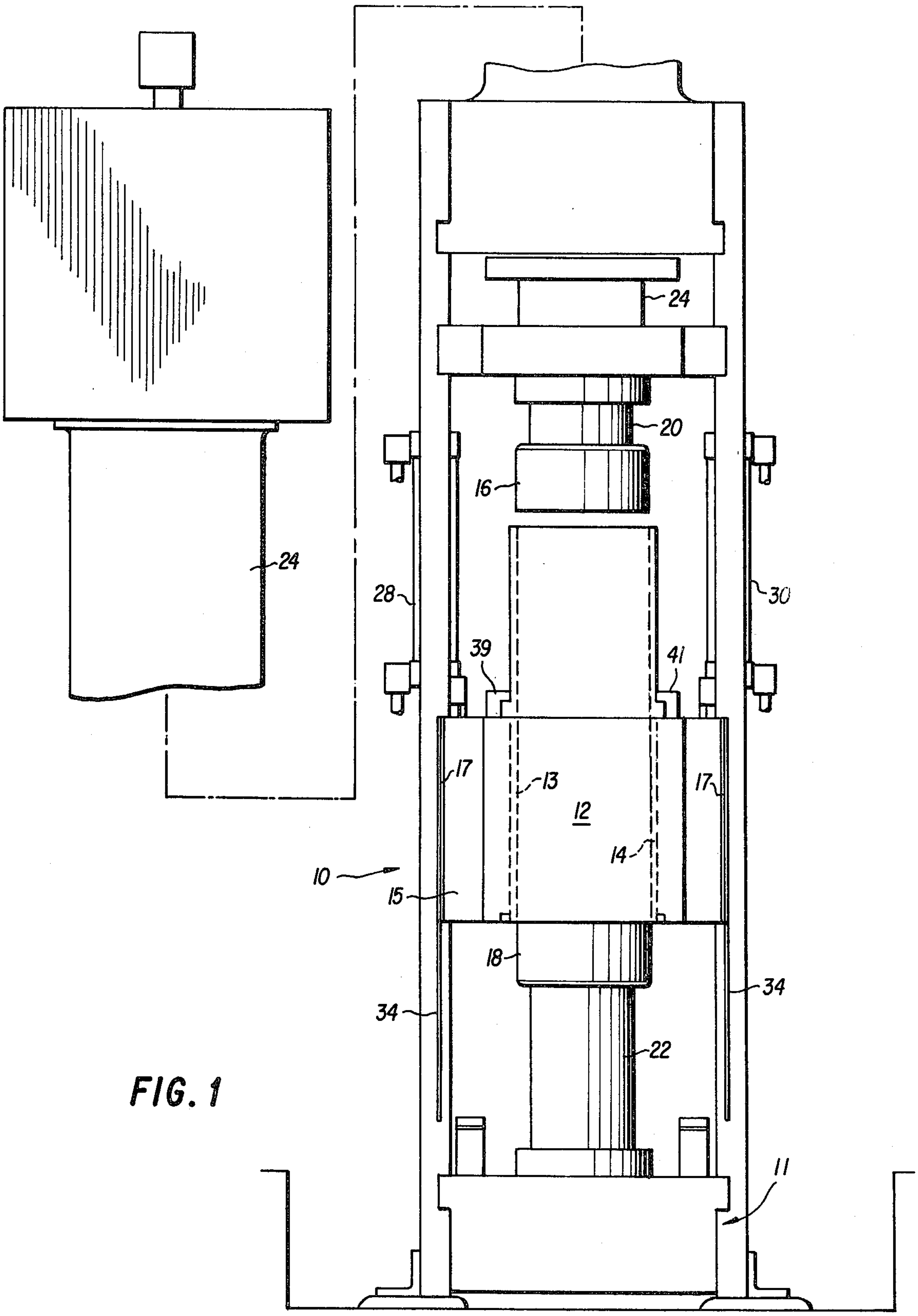
FIG. 1 is a front elevational view of an apparatus in accordance with the present invention.

The present invention relates to an apparatus and a process for removing liquid from a slurry of solid particulate material and for consolidating the material into a shape-retaining slug. As used herein the term "slurry" refers to a mixture of solid particulate material dispersed in a liquid, such as water. It odes not refer to mixtures of fibrous materials and liquid.

If a slurry is placed in a piston and cylinder arrangement and subject to one-dimensional consolidation stress, water will immediately begin to seep out from the mixture and continue to do so over a considerable period of time on an increasingly reduced rate and the slurry mixture will become increasingly more consolidated over time. Essentially, the process consists of transient flow of fluid through the slurry structure which compresses in time under the influence of the externally applied stresses. This compression takes place through the gradual transfer of the applied stresses from the pore water to effective stresses. The initial consolidation occurs as soon as the load is applied, largely by compression and solution of the air in voids between the particles. It also includes small amounts of compression of the solid phase and the water. The final compression of the slurry is primarily due to a change of saturation, if partially saturated, and change of void ratio of the slurry mixture. Under applied loads, the pore water pressure changes which, in turn, changes the gas pressure in bubbles. This causes a change in the volume of the bubbles due to a reduction in volume and an increase in the amount of gas dissolved in the pore liquid. After the excess hydrostatic pressure caused by the externally applied stresses has been dissipated, the compression does not cease. Instead it continues very slowly at an ever-decreasing rate indefinitely. This appears to be the result of a plastic readjustment of the soil grains to the new stress, of progressive breaking of the interparticle bonds, and even progressive crushing of the particles themselves.

Overall deformation of the slurry occurs as an integration of the usually irreversible movement of very small irregular particles under the microscopic stress patterns set up by the applied loads and the random geometry of the individual grain to grain contacts. On application of load to randomly oriented slurry, deformation occurs in the direction of the particles under the microscopic stress patterns set up by stress due in part to the approach of parallel clay plates under the stress and in part to a reorientation or rotation of some of the particles under the influences of microstresses in the clay structure, exhibiting the microscopic deformation called consolidation.

After the removal of the externally applied load, the only mechanism which will try to bring the reoriented particles back to their original position is the elastic interaction at the points of contact of the particles. The osmotic or electrostatic forces between parallel sets of particles oriented at right angles to the applied stress direction may also act to try to drive the particles apart to their original equilibrium resulting in small expansion.

The percentage of consolidation of the slurry depends on a number of factors including the permeability of the mixture which governs the rate of flow of the water, the thickness of the slurry being compressed which influences both the volume of water that must seep out and the distance it must travel and the hydraulic gradient, and the number of previous boundaries of the slurry being compressed from which the water can leave.

In accordance with the present invention, an aqueous slurry of solid particulate material is subjected to compressive stress in an enclosed apparatus having a novel means for drainage of the water from the slurry and is consolidated in a short period of time to form a shape-retaining slug of the solid particulate material having a low water content.

The apparatus of the present invention comprises a consolidation chamber in which the slurry is to be consolidated, which is substantially sealed against the passage of solid material therefrom. The consolidation chamber comprises a cylindrical wall defining a cylindrical bore. The wall has sufficient thickness and strength to withstand the substantial compressive stresses to which the slurry will be subjected. A suitable cylindrical wall could be made of steel and have a thickness of about ½ inch to 4 inches and an inside diameter of about 1 to 20 inches. At least one piston is mounted for reciprocal movement axially within the bore of the cylinder. The opposite end of the cylindrical bore is closed with a circular end piece or a second piston movable axially within the bore of the cylinder to form an enclosed consolidation chamber. In a preferred embodiment two pistons are employed.

Either the pistons or the circular end piece is provided with drainage holes therethrough to permit the escape of water from the enclosed chamber during consolidation. Typically the pistons or end piece would be made from a cylindrical block of steel and the drainage holes extending from one circular face to the other would have a diameter of about 1/16 to ½ inch. A sufficient number of drainage holes should be provided so that the water can rapidly escape from the chamber during consolidation, but not so many that the piston or end piece is weakened structurally so that it is unable to withstand the compressive stress to which the slurry is to be subjected. If it is infeasible to drill a sufficient number of holes with that diameter through the piston, then a few larger holes can be provided which communicate with numerous small holes through a checker plate as hereinafter described.

In a preferred embodiment, a circular sheet of elastic material having the same diameter as the face of the end piece or the face of the piston is placed over each face with drainage holes therethrough. The sheet of elastic material can be made of any material which is capable of recovering its original size and shape after deformation caused by the compressive stress applied to the slurry during consolidation. Suitable elastic materials include elastomeric materials such as natural or synthetic rubbers. Natural rubber is particularly preferred since it has been found to remain elastic after repeated subjection to large compressive stresses. The elastic material typically would be between 1/16 inch and 1 inch thick depending upon the diameter of the cylinder, the size of the holes therethrough and the amount of compressive stress to be applied to the slurry. The holes which extend through the sheet of elastic material communicate with the drainage holes through the piston or end piece over which it is placed. The holes through the elastic material need not be the same size and shape as the drainage holes, provided that water can readily escape from the consolidation chamber during application of compressive stress to the slurry. When compressive stress is applied to the surface of the elastic material, the material tends to expand so that the holes become smaller in size. If the sheet is too thick and the holes are too small, the holes will become closed upon application of compressive strength. Therefore, the holes should be sufficiently large for any given thickness of the sheet to permit the flow of water therethrough during consolidation of the slurry.

It has been found that the sheet of elastic material often tends to creep laterally after repeated applications of compressive stress. This tendency can be eliminated by adhering the sheet of elastic material to the face of the piston or end piece or by adhering the sheet to a plate. The plate can be a circular sheet of steel typically having a thickness of 1/16 inch to 1 inch. The circular plate is provided with a plurality of holes extending therethrough which communicate with the holes through the sheet of elastic material and the drainage holes through the piston or end piece. The sheet of elastic material is adhered to the surface of the circular plate so that the holes through each are aligned. The elastic material-circular plate laminate is then placed over the face of the piston or the end piece so that the holes through the circular plate communicate with the drainage holes through the piston or end piece. In this way, the tendency of the elastic material to creep and obstruct the drainage holes is eliminated.

In a preferred embodiment, the circular plate is made from a sheet of metal one surface of which is flat and the opposite surface of which has a plurality of raised portions. The circular plate could suitably be made from what is known as checker plate. The elastic material would be adhered to the flat surface of the checker plate and the holes through the plate would extend from the lowered portions of the opposite surface through the sheet of elastic material. When the checker plate is placed against the face of the piston or the end piece, communicating passageways are formed around the raised portions of the checker plate. These passageways also communicate with the drainage holes which extend through the piston or the end piece. This eliminates the need for a large number of drainage holes through the piston or end piece communicating directly with the plurality of holes which extend through the sheet of elastic material. It will be appreciated that since the piston may be made from a 6 inch thick cylindrical block of steel, the fewer the drainage holes which must extend through the piston, the easier it is to manufacture. All that is required is that there be drainage holes of sufficient size and number extending through the piston or end piece to permit the water being removed from the slurry during consolidation to readily escape from the consolidation chamber.

A pair of woven wire screens are placed adjacent to the sheet of elastic material. The two screens are both formed with a plain weave having the same mesh size. The mesh size can range from about 300 mesh to about ¼ inch (U.S. Standard Sieve Series). The preferred mesh size depends upon the type of slurry being consolidated. For example, a mesh size ranging from about 28 mesh to 150 mesh is preferred for use with coal slurries, with a mesh size of 75 mesh being particularly preferred, from about 100 mesh to 250 mesh is preferred for copper concentrates or precipitates, and from about 100 mesh to 250 mesh is preferred for slurries of iron ore. The two screens are preferably disposed in juxtaposition with each other so that the points where the wires of one screen cross are adjacent to the openings through the other screen. However, it is not necessary that the screens be so positioned initially. When compressive stress is applied to the charge of slurry in the consolidation chamber, the two screens are forced together and against the sheet of elastic material so that the portions of the woven wires of one screen which face the other screen at the points where the wires of the first screen cross engage the openings in the second screen. Since the raised portions of one screen will slide into the recessed portions of the other screen when compressive stress is applied to the two screens, it is not necessary for the points where the wires of one screen cross to be positioned adjacent to the openings through the other screen prior to application of compressive stress.

When the two screens are intimately engaged during the application of compressive stress, a porous screen structure is formed in which the effective mesh size is substantially smaller than the mesh size of either screen alone. If the points at which the wires of one screen cross are adjacent to the centers of the openings, then looking perpendicular to the plane of the screens the size of the openings appears less than half of the size of the openings of each screen along. For example, in a 70 mesh screen (U.S. Standard Sieve Series), the openings are 210 microns in size and the wires used to weave the screen are typically 182 microns in diameter. If the points where the wires of one 70 mesh screen cross are adjacent to the centers of the openings of the other 70 mesh screen, then the size of the openings of the two screens intimately engaged will appear to be 14 microns when viewed perpendicular to the screens. If the two engaged screens are viewed at an angle of less than 90° to the plane of the screens, the openings will appear slightly larger. Although some of the solid particles in the slurry being consolidated may travel diagonally through the two engaged screens, it is clear that the effective mesh size of the screens has been substantially reduced, and perhaps, by more than an order of magnitude.

What is equally significant about the porous structure of the present invention is the fact that after the slurry has been consolidated and the compressive stress has been removed from the consolidation chamber, the sheet of elastic material returns to its original thickness causing the two screens to become disengaged. The two screens are sufficiently separated from each other and from the sheet of elastic material by the expansion of the elastic material so that the effective mesh size of the pair of screens returns to the mesh size of each individual screen. If any of the solid particles in the slurry become lodged in the porous structure formed by the two engaged screens during consolidation, the expansion of the sheet of elastic material and the separation of the two screens and the sheet of elastic material resulting from that expansion causes the particles to become immediately dislodged from the screens. Since the double screen-elastic material porous structure is, in effect, self-cleaning, it is very difficult for the structure to become permanently clogged with particulate material after repeated consolidations of the slurry. Thus, the tendency of solid particles to become lodged and to accumulate as they did in prior art porous structures is alleviated by the double screen-elastic material porous structure of this invention. In addition, it will be appreciated that it is possible with the double screen structure to obtain a relatively small effective mesh size using two relatively large mesh screens. Since the screens with larger openings are made with heavier gauge wire and the two screens are supported by a sheet of elastic material, the screens resist permanent deformation from the repeated subject to high levels of compressive stress.

In order to ensure that the two screens will not become permanently deformed by the recurring application of high compressive stress, a third woven wire screen having a mesh size larger than that of the two identical screens is disposed between the sheet of elastic material and the pair of screens. The two screens with lighter gauge wire and smaller openings than the third screen are used primarily to form the porous structure which removes water from the slurry during consolidation. The larger third screen provides structural support to the porous structure. The mesh size of the third screen is preferably a multiple of the mesh size used for the pair of screens so that upon application of compressive stress to the slurry in the chamber, the portions of the woven wires of the larger screen which face the smaller screen at the points where the wires of the larger screen cross intimately engage every second or third opening, for example, of the smaller screen. For example, if the two smaller screens are each 200 mesh, then the larger screen could be 100 mesh or 50 mesh. Additional larger screens can be employed in the porous structure if further support of the pair of screens is required.

The circular plate, sheet of elastic material, pair of screens, and third screen if desired, are preferably securely attached together as a single unit. This unit can then be fastened to the face of the piston or end piece with the plate adjacent to the circular face of the piston or end piece in a manner which will permit it to be readily removed in the event that it needs to be replaced.

Using the apparatus described above, water can be easily removed from slurries of solid particulate material and the solid particulate material can be formed into shape-retaining slugs. The apparatus is particularly suitable for consolidating mineral slurries, such as slurries of coal, copper, molybdenum, iron ore, and the like.

Such slurries are readily consolidated by first placing a charge of the slurry in the cylindrical bore. The bore is then closed by a piston and a circular end piece or by two pistons to form a consolidation chamber. The slurry in the chamber is then subjected to one-dimensional consolidation by the application of compressive stress through at least one piston capable of reciprocal movement axially within the bore. Upon the application of compressive stress, slurry is forced against the porous structure covering the drainage holes causing the pair of identical screens to be forced against the third larger screen, if employed, which in turn, is forced against the sheet of elastic material. The entire porous structure is compressed so that the portions of the woven wires of one of the pair of screens which face the other screen at the points where the wires of the first screen cross engage the openings in the second screen. The particles in the slurry tend to agglomerate quickly and bridge the openings in the porous structure within a few seconds and the water in the slurry rapidly escapes through the porous structure and the drainage holes.

In order to consolidate slurries in accordance with the present invention, pressures of at least about 900 psi should be applied to the piston in the consolidation cylinder. The amount of pressure required will depend on the type of slurry being consolidated and on the size of the solid particles in the slurry. For example, it is preferable that a pressure of at least about 4000 psi be applied to a coal slurry in order to readily consolidate it, whereas a copper concentrate can be readily consolidated at 900 psi. It is only necessary that this pressure be applied to the slurry for periods of less than 1 minute, and typically, for just a few seconds.

A shape-retaining slug of the solid material with low water content is produced upon consolidation of the slurry. It has been found that mineral slurries can be consolidated into slugs containing less than about 12 percent by weight of water. For example, coal slurries can be consolidated typically into slugs having a water content of less than about 10 percent by weight, and copper concentrates can be consolidated into slugs having about 2 percent by weight of water.

Figure 2:
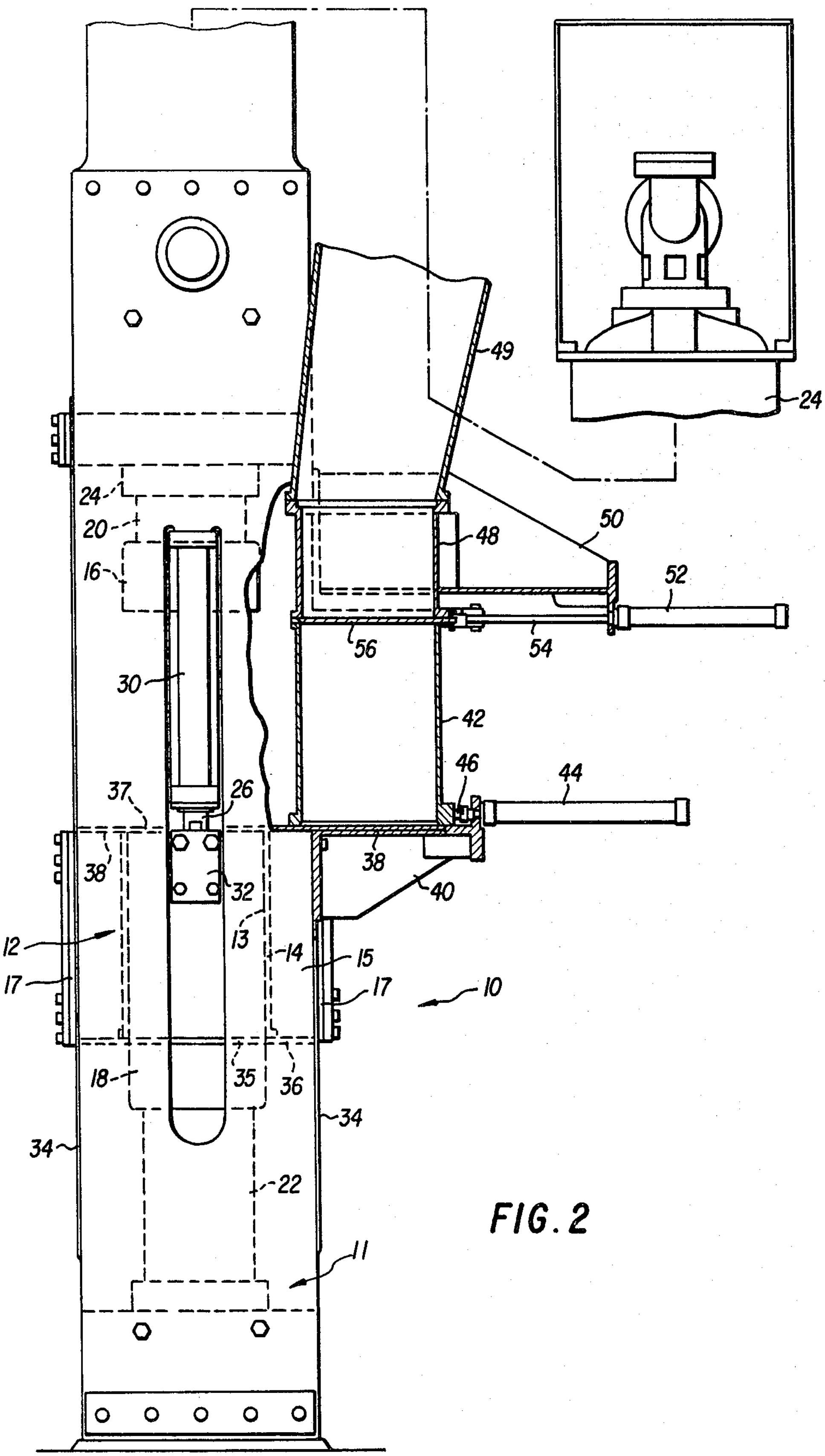
FIG. 2 is a side elevational view of the apparatus shown in FIG. 1.

Referring now to the drawings, FIGS. 1 and 2 illustrate the front and side elevational views of preferred embodiments of a consolidation and separation apparatus in accordance with the present invention. The numeral 10 refers to the apparatus generally, number 11 refers to the supporting frame generally, and the numeral 12 refers to the consolidation chamber generally. Consolidation chamber 12 comprises a mold 14 with a solid cylindrical wall defining a cylindrical bore 13 and two pistons 16 and 18. Piston 16 is securely attached to piston rod 20 and is reciprocated axially within mold 14 by pressure means 24, such as hydraulic cylinder, which is securely attached to supporting frame 11. Piston 18 is stationary and mounted securely to supporting frame 11 through piston rod 22. The face of piston 18 is positioned within the wall of mold 14. When pressure means 24 is actuated, piston 16 moves downward axially within the wall of mold 14 thereby forming an enclosed consolidation chamber within which a charge of slurry can be consolidated. The face of either piston 16 or piston 18 or both can be provided with a porous structure capable of separating solid material from the liquid in a slurry and a means for escape of the water from the enclosed consolidation chamber, not shown. A preferred porous structure is shown in FIGS. 3 to 6. Mold 14 is securely attached to supporting frame 15 by means of tables 36 and 38 having circular openings 35 and 37, respectively, which communicate with bore 13. Wear plates 17 attached to frame 15 are slidable vertically on wear plates 34 attached to frame 11. Pressure means 28 and 30, such as the hydraulic cylinders shown are securely mounted to supporting frame 11. Piston rods extending from cylinders 28 and 30 are securely attached to flanges which are securely attached to supporting frame 15. In FIG. 2, piston rod 26 extending cylinder 30 is shown attached to flange 32 which is attached to frame 15. Securely attached to the top of mold 14 is a horizontal table 38 supported on bracket 40. Charging box 42, shown as an open-ended cylinder, rests on and is slidable horizontally over the top surface of table 38 in tracks formed by L-shaped flanges 39 and 41. Pressure means 44, such as the hydraulic cylinder shown, is securely mounted to table 38. Piston rod 46 extending from cylinder 44 is securely attached to charging box 42. The slurry to be consolidated is fed to charging box 42 by means of filling box 48, shown as an open-ended cylinder, which is supported above charging box 42 by bracket 50 which is securely mounted to frame 11. Filling box 48 is fed by hopper 49. Pressure means 52, such as the hydraulic cylinder shown, is securely mounted to bracket 50. Piston rod 54 which extends from cylinder 52 is securely attached to cut-off knife 56 which forms a barrier between filler box 48 and charging box 42.

Figure 3:
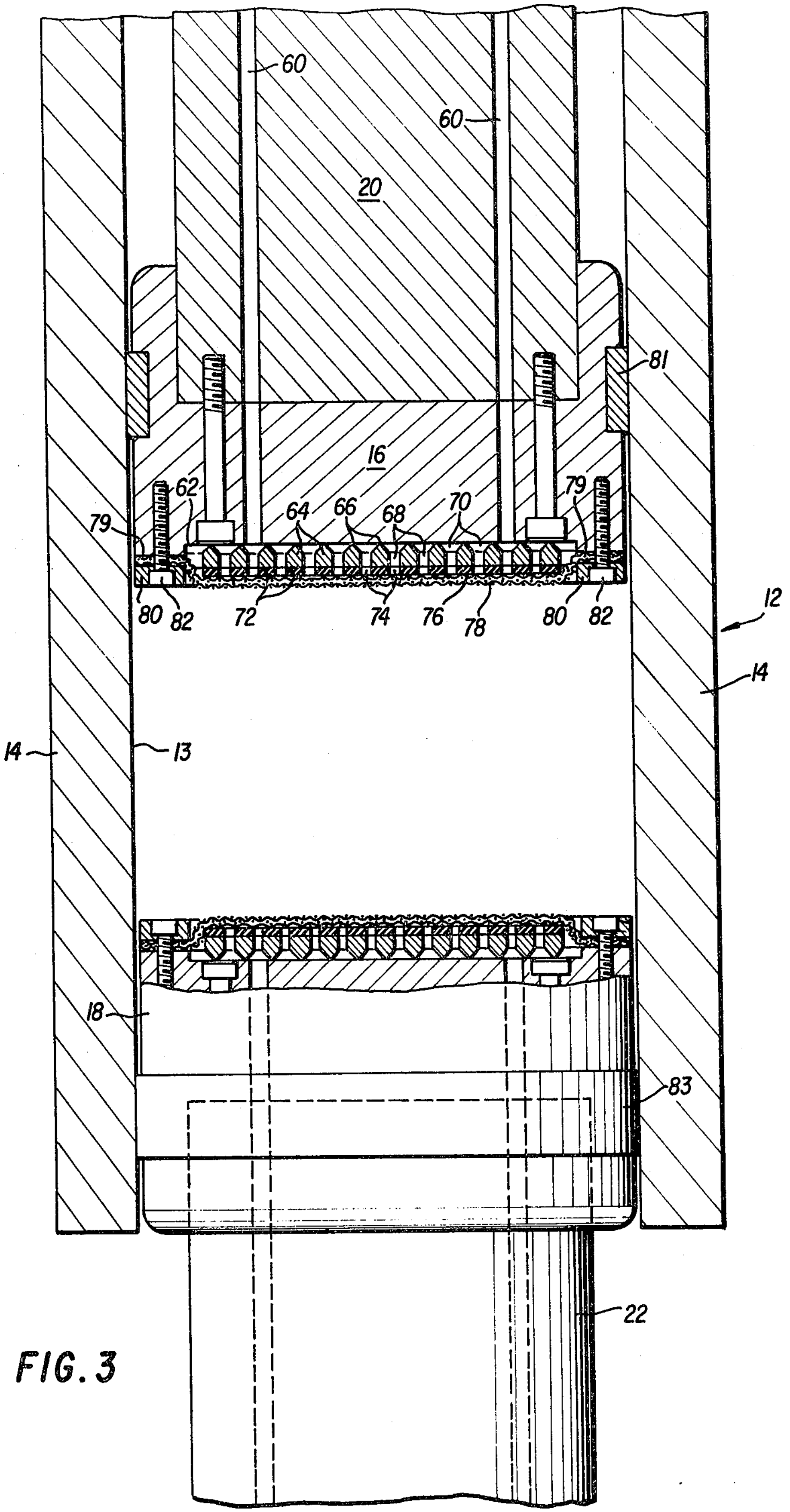
FIG. 3 is a detailed side elevational view of the consolidation chamber of the present invention.

FIG. 3 is an enlarged detailed elevational view of consolidation chamber 12 partially cut away to show the interior thereof including the preferred porous structure. Reciprocating piston 16 is shown within cylindrical bore 13 of wall 14 attached to piston rod 20. Stationary piston 18 is shown within cylindrical bore 13 of mold 14 attached to piston rod 22. Depending upon the type of slurry being consolidated, the tolerance between the pistons and the inside wall of mold 14 can range typically from about 0.0005 inch to 0.5 inch. If zero tolerance is required, piston rings, such as 81 and 83, can be employed. Since pistons 16 and 18 are identical, piston 18 is not shown entirely cut away so that both the interior and exterior of the pistons can be shown. Drainage holes 60 extend through piston 16 from a circular area 62 recessed in the face of piston 16. A circular plate 64 having a flat surface on one side and having raised portions 66 on the other side is placed in recess 62 with the raised portions 66 being in surface contact with the face of piston 16. A plurality of holes 68 extend through plate 64 at the portions of the plate which are not raised. The contact of the raised portions of plate 64 and the face of piston 16 in this manner forms communicating passageways 70 around the raised portions 66. A circular sheet of elastic material 72 having a plurality of holes 74 extending therethrough is positioned over plate 64 in recess 62 so that holes 74 communicate with holes 68 through plate 64. Drainage holes 60 communicate with passageways 70, which in turn communicate with holes 68, which in turn communicate with holes 74 to provide a means for water being removed from the slurry in the chamber during consolidation to escape. A pair of identical screens 76 and 78 is positioned over the sheet of elastic material 72 in recess 62. Screens 76 and 78 are larger in diameter than plate 64 and sheet 72 and extend into annular recess 79. If desired, a third screen (not shown) having a mesh size larger than that of screens 76 and 78 can be positioned between sheet 72 and screen 76. An annular ring 80 is removably fastened to the face of piston 16, for example, by means of screws 82 shown. The inner edge of annular ring 80 extends over the outer edge of screens 76 and 78 thereby retaining screens 76 and 78 within recess 79, and elastic material 72 and plate 64 within recess 62 and adjacent to the face of piston 16.

Figure 4:
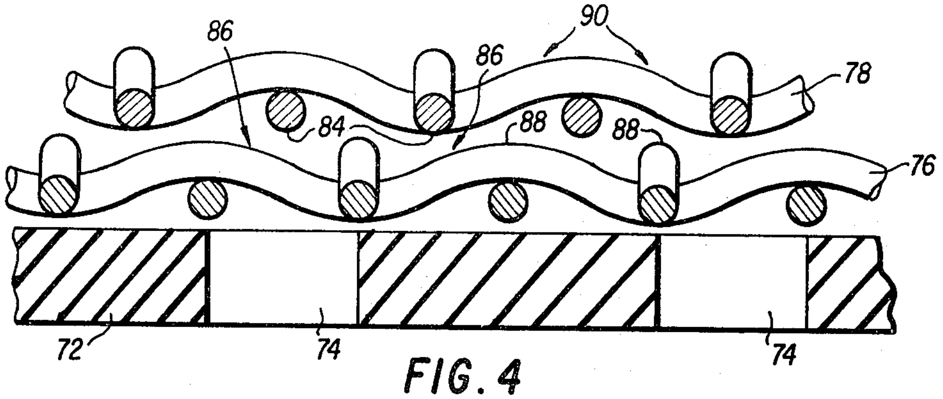
FIGS. 4 and 5 are detailed side elevational views of the operation of a pair of screens and sheet of elastic material in the porous structure of the present invention.
Figure 5:
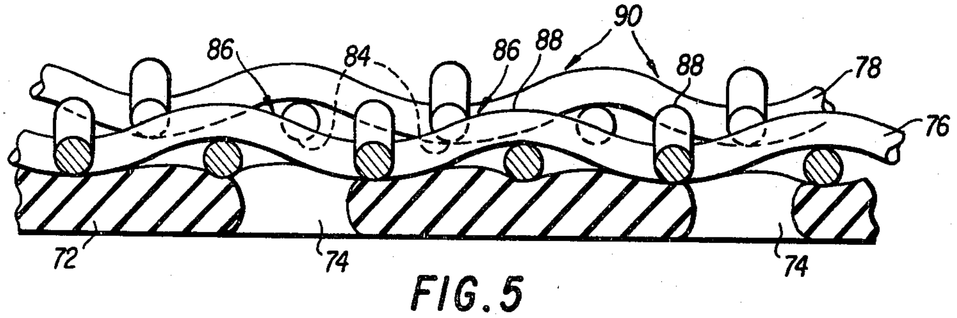
Figure 6:
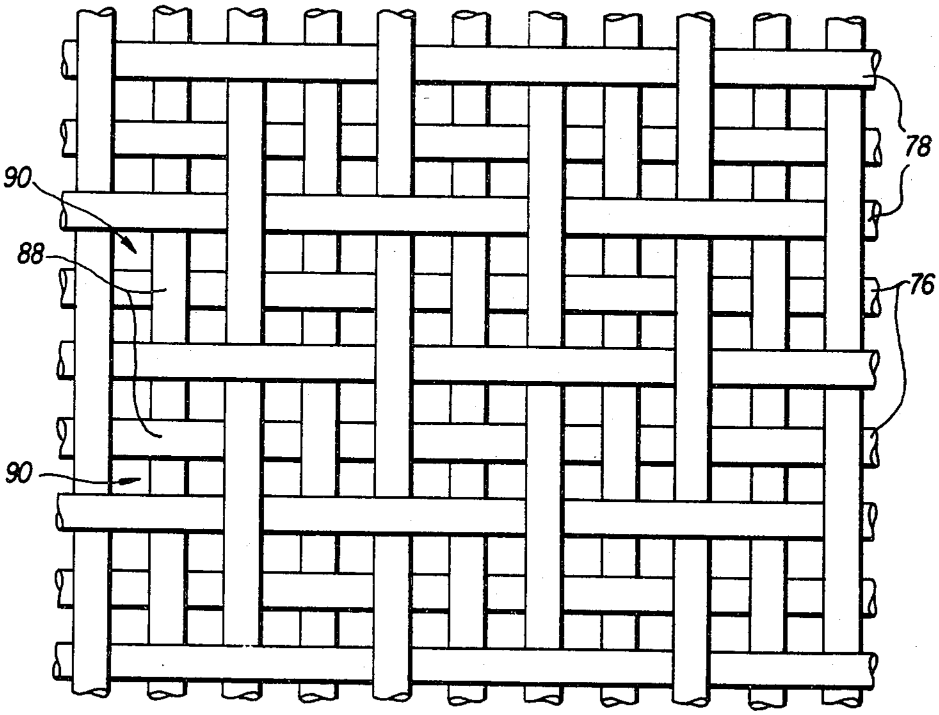
FIG. 6 is a plan view of the pair of screens shown in FIGS. 4 and 5.

FIGS. 4 and 5 illustrate detailed elevational views of the operation of the preferred porous structure for use in the consolidation apparatus of the present invention. The drawings are not necessarily to scale, but are intended simply to illustrate the manner in which the invention functions. FIG. 4 shows the two screens 76 and 78 both having the same plain weave and mesh size. Screen 76 is positioned over the sheet of elastic material 72 having holes 74 extending therethrough. Screen 78 is shown positioned over screen 76 so that the points 84 where the wires of screen 78 cross are adjacent to the openings 86 through screen 76, and similarly, that the points 88 where the wires of screen 76 cross are adjacent to the openings 90 through screen 78. The points where the wires of each screen cross are shown in the preferred position adjacent to the centers of the openings through the other screens. Screens 76 and 78 and sheet of elastic material 72 are shown separated from each other in the positions that they would occupy when compressive stress is not being applied to a slurry in the consolidation chamber above screen 78. Referring now to FIG. 5, when the slurry in the consolidation chamber, which would be above screen 78 as shown, is subjected to compressive stress, screen 78 is forced against screen 76 which in turn is forced against sheet of elastic material 72. This compressive stress forces the portions of the wires of screen 78 which face screen 76 at the points 84 where the wires of screen 78 cross to intimately engage the openings 86 of screen 76. Likewise, the portions of the wires of screen 76 which face screen 78 at the points 88 where the wires of screen 76 cross imtimately engage the openings 90 in screen 78 upon application of compressive stress. Since the raised areas of one screen at the points where the wires cross will slide into the recessed areas in the openings of the other screen when compressive stress is applied to the two screens, the structure shown in FIG. 5 will be obtained regardless of whether the screens are initially positioned as shown in FIG. 4. FIG. 6 is a plan view of screens 76 and 78 showing how the points 88 where the wires of screen 76 cross become centrally located within the openings 90 in screen 78.

Figure 7:
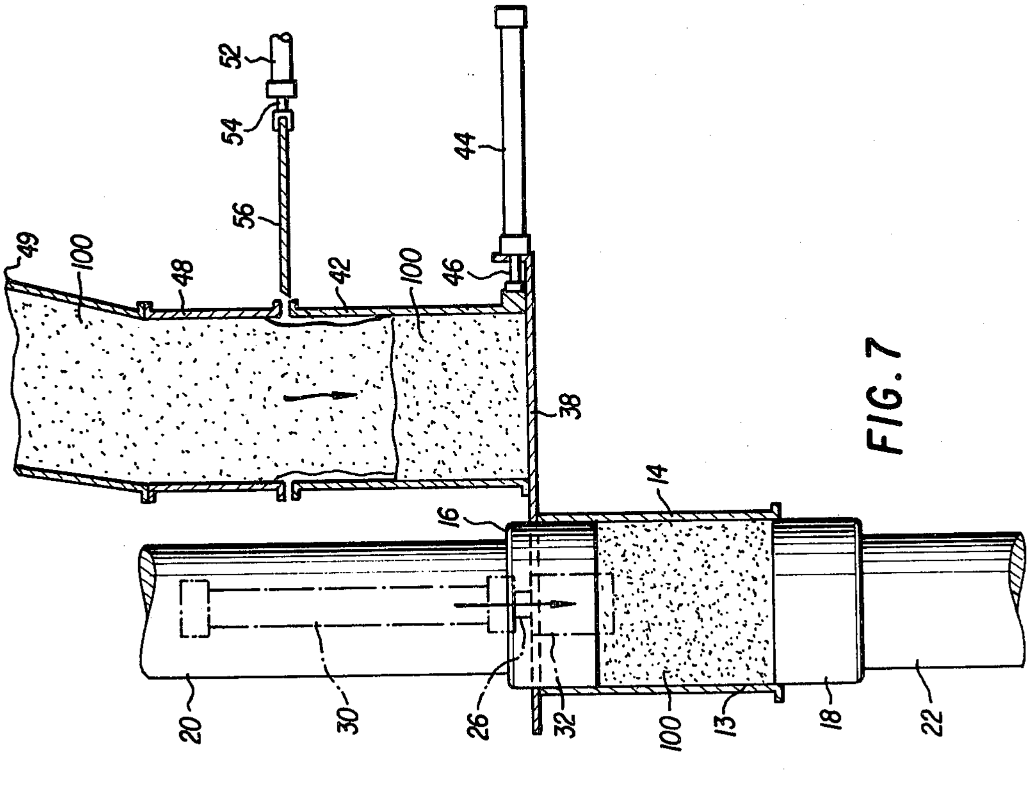

FIGS. 7 to 11 illustrate sequentially the operation of a preferred apparatus for removing liquid from slurries of solid particulate materials and consolidating the solid materials into shape-retaining slugs in accordance with the present invention. Much of the supporting frame has been deleted to simplify the drawings. Referring to FIG. 7, consolidation mold 14 is positioned vertically above stationary piston 18 attached to piston rod 22 mounted securely to the supporting frame (not shown) so that the face of piston 18 is sufficiently within the bore of mold 14 to close off the lower end to the passage of slurry. Mold 14 is held in position by pressure means 30 and 28 (not shown) having their piston rods in a retracted position. Pressure means 30, piston rod 26 and flange 32 attached to frame 15 (not shown) and table 38 are shown in phantom in FIGS. 7 to 11 to illustrate the operation of both pressure means 28 and 30 during the entire consolidation process. In its compression position, mold 14 is filled with slurry 100 and pressure means 24 (not shown) is actuated and applies compressive stress to piston 16 through piston rod 20 thereby consolidating the slurry 100 within mold 14. As the slurry consolidates within mold 14, compressive stress from pressure means 24 is transmitted to the walls of mold 14 forcing mold 14 downward relative to piston 18 until equal amounts of pressure are applied to the slurry by both pistons 16 and 18. When pressure means 28 and 30 apply enough pressure to support the weight of the filled mold 14 and offer some resistance to downward movement by mold 14 so that the mold 14 is free to move relative to both pistons, compressive stress is effectively applied to slurry 100 by both pistons 16 and 18. This arrangement is referred to as a floating platen mold. While slurry 100 in mold 14 is being consolidated, charging box 42 is positioned on table 38 by pressure means 44 with piston rod 46 in its retracted position directly beneath filler box 48 and hopper 49 and is being filled with a predetermined amount of slurry 100. In this position, cut-off knife 56 is retracted by piston rod 54 in a retracted position within pressure means 52 so that the lower end of filler box 48 is open and slurry 100 can freely pass from filler box 48 into charging box 42.

Figure 8:
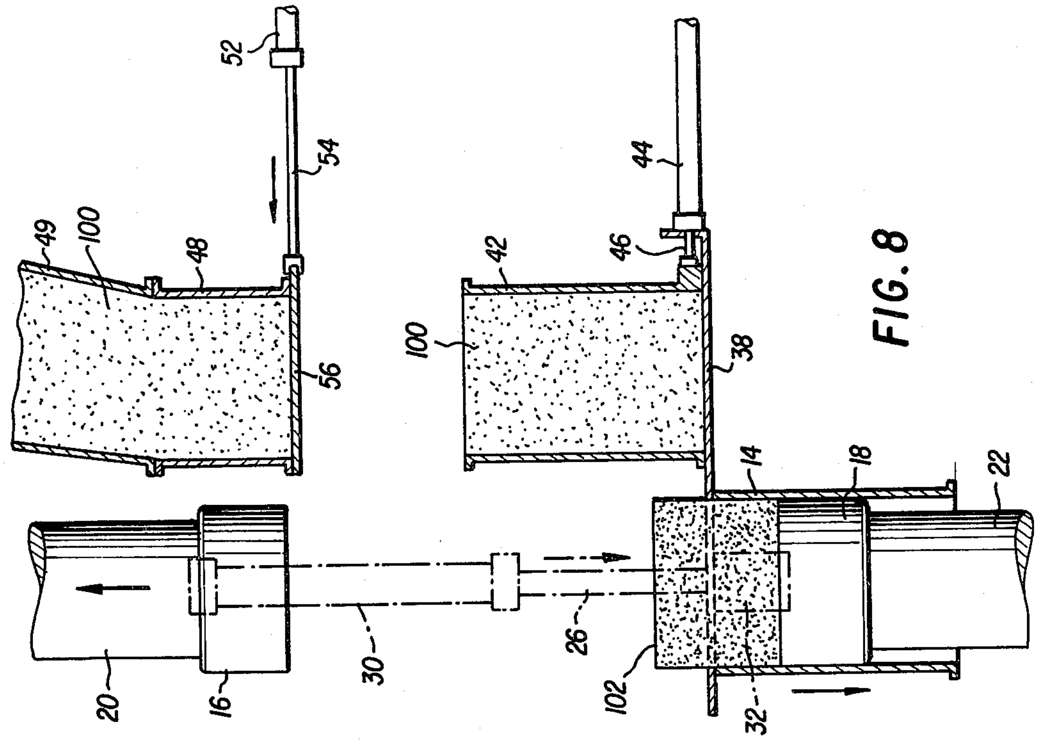
FIGS. 7–11 are partial side elevational views showing sequential steps in the operation of a preferred apparatus of the present invention.

As shown in FIG. 8, once the slurry in mold 14 has been consolidated into a shape-retaining slug of solid material 102 and the water has been removed, piston 16 is retracted by pressure means 24 (not shown). After pressure means 52 is actuated thereby extending piston rod 54 and closing off the flow of slurry from filling box 48 with cut-off knife 56, pressure means 30 and 28 (not shown) are actuated thereby extending their piston rods downward and removing mold 14 from slug 102 while lowering table 38 which is attached to mold 14 and which supports filled charging box 42.

Figure 9:
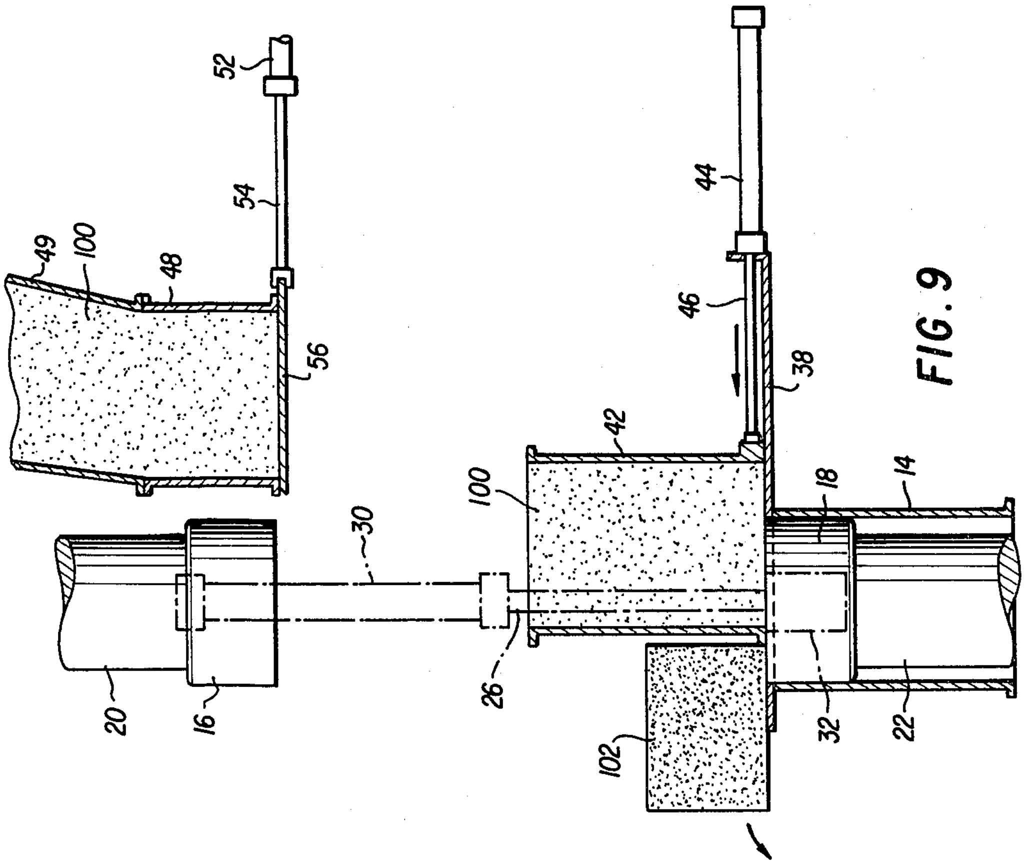

Referring to FIG. 9, when mold 14 is lowered so that the top of table 38 is flush with the face of piston 18, pressure means 44 is actuated thereby extending piston rod 46 and sliding charging box 42 on table 38 until it is disposed directly over mold 14. As charging box 42 is moved to its charging position over mold 14, it pushes slug 102 off of the face of piston 18 and off of the top of table 38 where it can then be collected or conveyed away appropriately.

Figure 10:
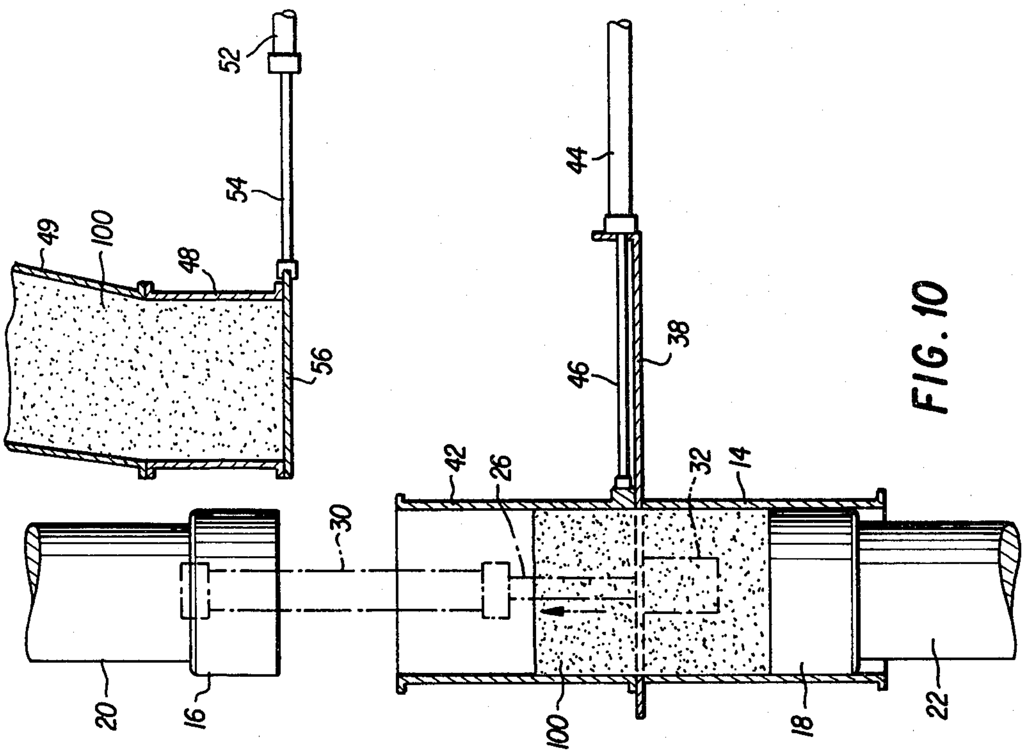

In FIG. 10, as soon as charging box 42 filled with slurry 100 is disposed over mold 14, pressure means 30 and 28 (not shown) are actuated to retract their piston rods thereby raising mold 14. As mold 14 is raised and the face of piston 18 becomes closer to the lower end of mold 14, the slurry 100 in charging box 42 passes into mold 14.

Figure 11:
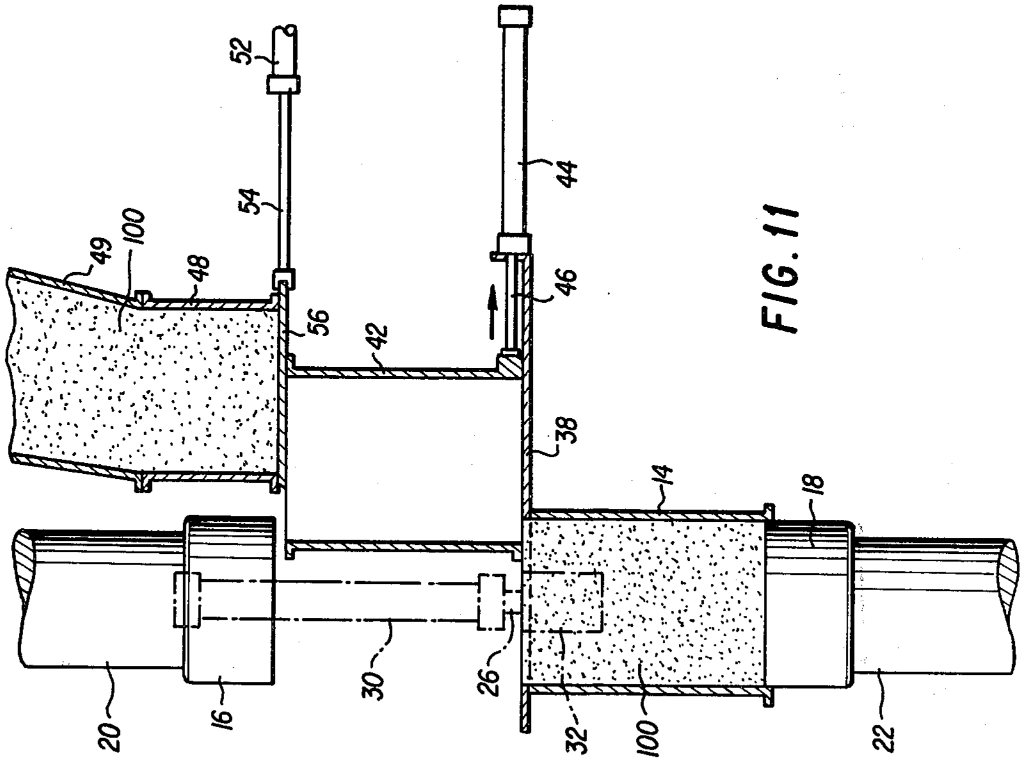

Referring to FIG. 11, once mold 14 is raised so that it is disposed in its original compression position and is completely filled with the slurry 100 from charging box 42, pressure means 44 is actuated thereby retracting piston rod 46 and sliding charging box 42 horizontally on table 38 until it is disposed in its filling position directly under filler box 48. The entire operation can then be repeated.

Suitable hydraulic systems for operation of hydraulic cylinders used as compression means 24 and pressure means 44 and 52 as well as suitable electrical systems for actuation of the various elements of the apparatus at the appropriate times will be readily apparent to those skilled in the art and any suitable systems can be employed in the practice of the present invention.

What is claimed is:

1. An apparatus for removing liquid from a slurry of solid particulate material and for consolidating said solid material into a shape-retaining slug, comprising (a) a cylindrical consolidation chamber in which the slurry is to be consolidated, which is substantially sealed against the passage of solid material, said chamber comprising (i) a first cylindrical piston mounted in a stationary position with its axis aligned vertically, the upper surface of said piston being its working face, (ii) a mold comprising a cylindrical wall defining a cylindrical bore in which said first piston is movable axially and which is disposed with its axis aligned vertically and a horizontal table having a circular opening through one end thereof, said table being mounted to the upper edge of said wall so that said opening communicates with said bore in said wall and the surface of the table extends outward from said wall in a direction perpendicular to the axis thereof, said mold having a compression position in which the face of said first piston is within the lower edge of said bore and a charging position in which the face of said first piston is at about the same level as the upper surface of said table, and (iii) a second cylindrical piston having its axis aligned vertically and movable axially within said cylindrical bore, the lower surface of said piston being its working face, (b) a drainage means for allowing liquid to escape from said chamber during consolidation of said slurry, (c) a porous structure for retaining solid particulate material within said chamber and for allowing liquid to escape from said chamber during consolidation, said porous structure being disposed between said drainage means and said slurry within said chamber, (d) a first pressure means for reciprocating said mold between its compression position and its charging position and for maintaining said mold in each of said positions, (e) a compression means for reciprocating said second piston axially within said bore and for applying compressive stress to said slurry within said chamber to cause consolidation thereof, (f) a charging box comprising at least one vertically aligned wall and two horizontally aligned open ends which define a volume, said box being slidable horizontally on said table between a filling position in which said box is disposed on said table so that the lower end of said box is closed to the flow of slurry therethrough and a charging position in which said box is disposed on said table so that the lower end thereof communicates with the bore of said mold, (g) a second pressure means for reciprocating said charging box between its filling position and its charging position by sliding said box on said table and for maintaining said box in each of said positions, (h) a means for filling said charging box with a predetermined amount of slurry, said filling means being disposed over said charging box when it is in its filling position, wherein (1) when said mold is filled with slurry and is in its compression position and said charging box is in its filling position, said compression means is actuated thereby moving said second piston downward into said bore of said mold and applying compressive stress to the slurry through said second piston to consolidate said slurry into a slug of solid material and said filling means is actuated thereby filling said charging box with a predetermined amount of slurry, (2) said compression means is then actuated thereby moving said second piston upward out of said chamber and said first pressure means is actuated thereby moving said mold from its compression position to its charging position and stripping the mold from the slug of solid material, (3) said second pressure means is then actuated thereby sliding said filled charging box on said table from its filling position to its charging position, thereby pushing said slug of solid material off of the upper surface of said first piston and said table, (4) said first pressure means is then actuated thereby moving said mold from its charging position to its compression position and filling the mold with the slurry in the charging box, and (5) said second pressure means is then actuated thereby sliding said empty charging box on said table from its charging position to its filling position.

2. The apparatus of claim 1 wherein said compressive means and said first and second pressure means are hydraulic cylinders.

3. The apparatus of claims 1 or 2 wherein said consolidation chamber, said compression means, and said first pressure means comprise a floating platen mold.

4. The apparatus of claim 1 wherein said drainage means comprises at least one drainage hole through one of said pistons, and said porous structure comprises (i) a circular sheet of elastic material having a plurality of holes therethrough, wherein said sheet is disposed relative to said piston or said circular wall so that the holes through said sheet communicate with the drainage means, and (ii) two woven wire screens having the same plain weave and the same mesh size, wherein one of said screens is disposed adjacent to said sheet of elastic material, and wherein said screens are disposed relative to each other so that when compressive stress is applied to the slurry in said chamber, the two screens are forced together against said sheet of elastic material so that the portions of the woven wires of one screen which face the other screen at the points where the wires of the first screen cross intimately engage the openings through the other screen.

5. The apparatus of claim 4 wherein the two screens have a mesh size between about 300 mesh and about ¼ inch (U.S. Standard Sieve Series).

6. The apparatus of claim 5 wherein the two screens have a mesh size between about 28 mesh and about 150 mesh (U.S. Standard Sieve Series).

7. The apparatus of claim 6 wherein the two screens have a mesh size of about 75 mesh (U.S. Standard Sieve Series).

8. The apparatus of claim 5 wherein the two screens have a mesh size between about 100 mesh and about 250 mesh (U.S. Standard Sieve Series).

9. The apparatus of claim 4 wherein the porous structure further comprises a third woven wire screen disposed between said sheet of elastic material and said first two screens, wherein the mesh size of said third screen is greater than that of said first two screens.

10. The apparatus of claim 4 wherein said screens are made of stainless steel.

11. The apparatus of claim 4 wherein the elastic material is an elastomeric material.

12. The apparatus of claim 11 wherein the elastomeric material is natural rubber.

* * * * *